(12) United States Patent
Zhu

(10) Patent No.: US 12,199,913 B2
(45) Date of Patent: Jan. 14, 2025

(54) CONTROL RESOURCE SET PROCESSING METHOD, DEVICE, AND COMPUTER STORAGE MEDIUM

(71) Applicant: XIAOMI COMMUNICATIONS CO., LTD., Beijing (CN)

(72) Inventor: Yajun Zhu, Beijing (CN)

(73) Assignee: XIAOMI COMMUNICATIONS CO., LTD., Beijing (CN)

( * ) Notice: Subject to any disclaimer, the term of this patent is extended or adjusted under 35 U.S.C. 154(b) by 353 days.

(21) Appl. No.: 17/762,356

(22) PCT Filed: Sep. 26, 2019

(86) PCT No.: PCT/CN2019/108307
§ 371 (c)(1),
(2) Date: Mar. 21, 2022

(87) PCT Pub. No.: WO2021/056362
PCT Pub. Date: Apr. 1, 2021

(65) Prior Publication Data
US 2022/0345274 A1 Oct. 27, 2022

(51) Int. Cl.
*H04W 28/20* (2009.01)
*H04L 5/00* (2006.01)
*H04W 16/14* (2009.01)

(52) U.S. Cl.
CPC .......... *H04L 5/0053* (2013.01); *H04L 5/0096* (2013.01); *H04W 16/14* (2013.01)

(58) Field of Classification Search
CPC ... H04L 5/0023; H04L 5/0048; H04L 5/0053; H04L 5/0064; H04L 5/0091; H04L 5/0096; H04L 5/0098; H04L 27/0006; H04W 16/14; H04W 28/20; H04W 48/12; H04W 72/0453; H04W 72/20; H04W 72/21; H04W 72/23; H04W 72/53; H04W 76/27

See application file for complete search history.

(56) References Cited

U.S. PATENT DOCUMENTS

| 11,108,529 B2* | 8/2021 | Su | H04W 48/12 |
| 11,115,868 B2* | 9/2021 | Kim | H04L 5/0091 |
| 11,381,373 B2* | 7/2022 | Song | H04W 72/23 |
| 11,800,547 B2* | 10/2023 | Zhu | H04W 72/53 |
| 11,871,451 B2* | 1/2024 | Awadin | H04W 74/0866 |
| 2019/0044689 A1* | 2/2019 | Yiu | H04W 72/23 |

(Continued)

FOREIGN PATENT DOCUMENTS

| CN | 108282290 A | 7/2018 |
| CN | 109075960 A | 12/2018 |

(Continued)

OTHER PUBLICATIONS

International Search Report of PCT/CN2019/108307 dated Jun. 23, 2020 with English translation, (4p).

(Continued)

*Primary Examiner* — Frank Duong
(74) *Attorney, Agent, or Firm* — Arch & Lake LLP

(57) ABSTRACT

A control resource set processing method is provided. In the method: a terminal switches a configuration of a control resource set on an unlicensed spectrum for detecting a control signaling in response to determining that a switching condition for the control resource set is met.

16 Claims, 7 Drawing Sheets

(56) References Cited

U.S. PATENT DOCUMENTS

2019/0313437 A1* 10/2019 Jung .................. H04W 74/006
2019/0319833 A1* 10/2019 Nagaraja ............... H04L 5/001
2019/0334687 A1    10/2019 Su et al.
2019/0349121 A1* 11/2019 Tian .................... H04L 5/0055
2022/0159733 A1*  5/2022 Cirik ................... H04L 5/0053

FOREIGN PATENT DOCUMENTS

| CN | 109328482 A  | 2/2019  |
| CN | 109451864 A  | 3/2019  |
| CN | 110121176 A  | 8/2019  |
| CN | 110149643 A  | 8/2019  |
| WO | 2018133631 A1 | 7/2018  |
| WO | 2018201892 A1 | 11/2018 |

OTHER PUBLICATIONS

The First Office Action issued in CN Application No. 201980002079.2 dated Feb. 24, 2023 with English translation, (16p).

* cited by examiner

CONTROL RESOURCE SET PROCESSING METHOD, DEVICE, AND COMPUTER STORAGE MEDIUM

CROSS-REFERENCE TO RELATED APPLICATION

This application is a U.S. national stage of International Application No. PCT/CN2019/108307, filed on Sep. 26, 2019, the disclosure of which is hereby incorporated by reference in its entirety for all purposes.

TECHNICAL FIELD

The present disclosure relates to communication technologies, and in particular, to a method, device, and computer storage medium for processing a control resource set.

BACKGROUND

The cellular mobile communication technology is in an evolution stage of a new generation technology. An important feature of the new generation technology is to support flexible configuration of various types of services. Since different service types have different requirements for wireless communication technologies, as driven by service requirements, service requirements cannot be met by only using the licensed spectrums. Therefore, it is considered to deploy mobile networks on unlicensed frequency bands.

SUMMARY

The present disclosure provides a method, a device, and a computer storage medium for processing a control resource set.

A first aspect of the present disclosure provides a method for processing a control resource set. The method includes: switching a configuration of a control resource set on an unlicensed spectrum for detecting a control signaling in response to determining that a switching condition for the control resource set is met.

A second aspect of the present disclosure provides a method for processing a control resource set, including: transmitting, by a base station, switching indication information for triggering a switching of a configuration of a control resource set for detecting a control signaling on an unlicensed spectrum.

A third aspect of the present disclosure provides a device for processing a control resource set. The device includes: a processor; and a memory for storing instructions executable by the processor; the processor is configured to execute the executable instructions to: determine whether a switching condition for a control resource set is met; and switch a configuration of the control resource set for detecting a control signaling on the unlicensed spectrum, in response to determining that the switching condition for the control resource set is met.

It should be understood that the above general description and detailed description described below are only exemplary and explanatory, and not intended to limit the present disclosure.

BRIEF DESCRIPTION OF THE DRAWINGS

The drawings herein are incorporated into the specification and constitute a part of the specification, show embodiments that conform to the disclosure, and are used to explain the principle of the disclosure in conjunction with the specification.

DETAILED DESCRIPTION

Figure 1:
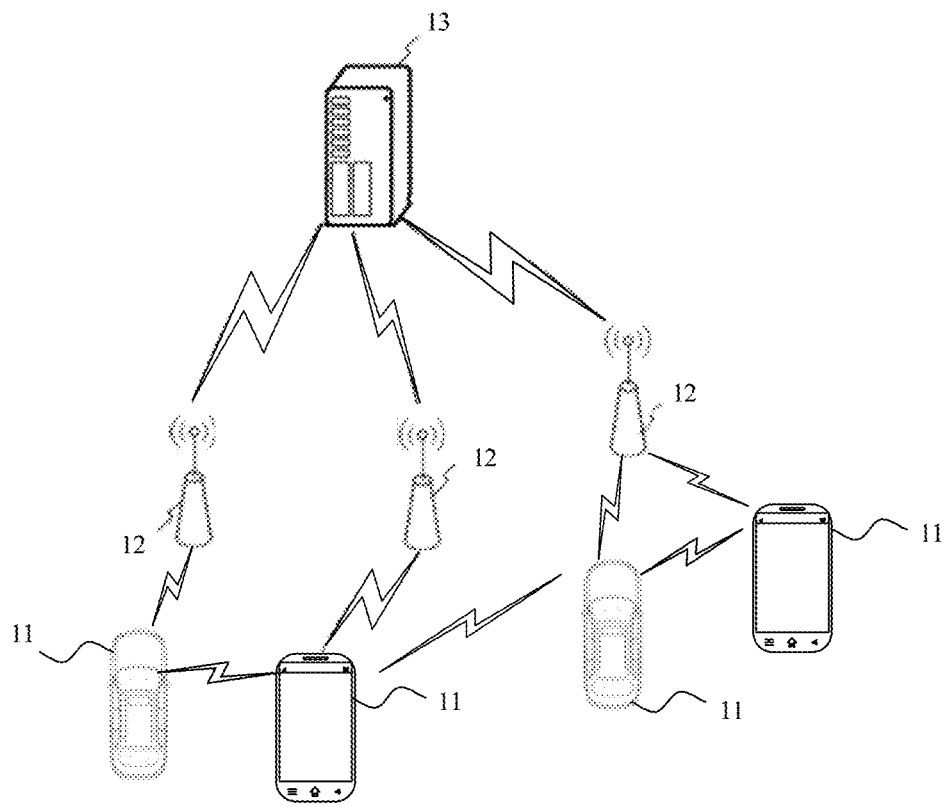
FIG. 1 is a schematic structural diagram illustrating a wireless communication system according to some examples of the present disclosure.

The embodiments shown in the accompanying drawings will be described in detail here. When the following description refers to the drawings, unless otherwise indicated, the same numbers in different drawings indicate the same or similar elements. The implementation manners described in the following embodiments do not represent all implementation manners consistent with the present disclosure. On the contrary, they are merely examples of devices and methods consistent with some aspects of the present disclosure as recited in the appended claims.

The terms used in the embodiments of the present disclosure are only used for describing particular embodiments, and are not intended to limit the embodiments of the present disclosure. As used in the embodiments of the present disclosure and the appended claims, the singular forms "a", "an" and "the" are intended to include the plural forms as well, unless the context clearly dictates otherwise. It will also be understood that the term "and/or" as used herein refers to and includes any and all possible combinations of one or more of the associated listed items.

It should be understood that although terms such as "first", "second", "third" may be used in the embodiments of the present disclosure to indicate various pieces of information, such information should not be limited to these terms. These terms are only used to distinguish the same type of information from each other. For example, without departing from the scope of the embodiments of the present disclosure, the first information may also be referred to as the second information, and similarly, the second information may also be referred to as the first information. Depending on the context, the words "if" and "in case" as used herein can be interpreted as "at the time of . . . " or "when . . . " or "in response to determining".

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

In view of the application of the new generation communication system on the unlicensed spectrum, since the communication system running on the unlicensed spectrum needs to first detect whether a channel is idle, a carrier or bandwidth part may contain multiple channel detection units, then channel detection results on different channel detection units may be inconsistent with each other. As a result, a part of the control information cannot be transmitted because the channel is not available. In a new generation communication system, the transmission of control signaling is carried on a control resource set (CORESET), and the configuration of the control resource set may be continuous or discontinuous in the frequency domain. In the related art, in order to ensure a reception performance of the control information, the user equipment has to detect the control signaling through a detection method with high complexity.

Reference is made to FIG. 1, which is a schematic structural diagram illustrating a wireless communication system provided by some embodiments of the present disclosure. As shown in FIG. 1, the wireless communication system is a communication system based on cellular mobile communication technology, and the wireless communication system may include several terminal devices 11 and several base stations 12.

The terminal device 11 may refer to a device that provides voice and/or data connectivity to a user. The terminal device 11 may communicate with one or more core networks via a radio access network (RAN). The terminal device 11 may be an IoT terminal, such as a sensor device, a mobile phone (or called as "cellular phone"), and a computer with an IoT terminal, for example, a stationary, portable, pocket-sized, hand-held, computer built-in or in-vehicle device. For example, the terminal device 11 may be a station (STA), a subscriber unit, a subscriber station, a mobile station, a mobile, a remote station, an access point, a remote terminal, an access terminal, a user terminal, a user agent, a user device or user equipment (UE). As another example, the terminal device 11 may also be a device of an unmanned aerial vehicle. As another example, the terminal device 11 may also be an in-vehicle device, for example, a trip computer with a wireless communication function, or a wireless communication device externally connected to a trip computer. As another example, the terminal device 11 may also be a roadside device, for example, may be a streetlight, a signal light, or other roadside device having a wireless communication function.

The base station 12 may be a network-side device in a wireless communication system. The wireless communication system may be the 4th generation mobile communication (4G) system, which is also known as Long Term Evolution (LTE) system; or, the wireless communication system may also be a 5G system, which is also known as New Radio (NR) system or 5G NR system. Alternatively, the wireless communication system may also be a next-generation system of the 5G system. Among them, the access network in the 5G system may be called as New Generation-Radio Access Network (NG-RAN). Alternatively, the wireless communication system may also be a Machine-Type Communication (MTC) system.

The base station 12 may be an evolved base station (eNB) used in the 4G system. Alternatively, the base station 12 may also be a base station (gNB) in the 5G system that adopts a centralized distributed architecture. When adopting a centralized distributed architecture, the base station 12 usually includes a central unit (CU) and at least two distributed units (DU). The central unit is provided with a protocol stack of a Packet Data Convergence Protocol (PDCP) layer, a Radio Link Control (RLC) Protocol layer, and a Media Access Control (MAC) layer; and the distribution unit is provided with a physical (PHY) layer protocol stack. The specific implementation manner of the base station 12 is not limited in the embodiments of the present disclosure.

A wireless connection can be established between the base station 12 and the terminal device 11 through a wireless air interface. In different embodiments, the wireless air interface is a wireless air interface based on the fourth generation mobile communication network technology (4G) standard; or a wireless air interface based on the fifth generation mobile communication network technology (5G) standard, such as a new air interface; or a wireless air interface based on a 5G next-generation mobile communication network technology standard.

In some embodiments, for example, in scenes such as V2V (Vehicle to Vehicle) communication, V2I (Vehicle to Infrastructure) communication and V2P (Vehicle to Pedestrian) communication among Vehicle to Everything (V2X) communication, an End to End (E2E) connection may also be established between the terminal devices 11.

In some embodiments, the wireless communication system may further include a network management device 13.

Several base stations 12 are respectively connected to the network management device 13. The network management device 13 may be a core network device in the wireless communication system. For example, the network management device 13 may be a mobility management entity (MME) in an evolved packet core network (EPC). Alternatively, the network management device may also be other core network devices, such as a serving gateway (SGW), a public data network gateway (PGW), a policy and charging rules function (PCRF) or a home subscriber server (HSS), etc. The implementation form of the network management device 13 is not limited in the embodiments of the present disclosure.

New Internet applications such as virtual reality (VR)/ augmented reality (AR) and vehicle-to-vehicle communication continue to spring up, which has put forward higher requirements for wireless communication technology, and driven the continuous evolution of wireless communication technology to meet the needs of applications. At present, cellular mobile communication technology is in the evolution stage of a new generation technology. An important feature of the new generation technology is to support flexible configuration of various service types. Different service types have different requirements for wireless communication technologies. For example, requirements for Enhanced Mobile Broad Band (eMBB) service mainly focus on large bandwidth and high rate; requirements for Ultra Reliable & Low Latency Communication (URLLC) service mainly focus on high reliability and low latency; and requirements for massive Machine Type Communication (mMTC) service mainly focus on large number of connections. Therefore, a new generation of wireless communication system requires a flexible and configurable design to support the transmission of various service types.

As impelled by the service requirements, the service requirements cannot be met by only using the licensed spectrum, thus the mobile network is considered to be deployed on the unlicensed frequency band. However, other systems such as a Wi-Fi system might be existed in the unlicensed frequency band. Therefore, it needs to study how to ensure that different communication systems share resources fairly on the unlicensed frequency band.

In the development process of a wireless communication system, for the unlicensed spectrum, in the 3rd Generation Partnership Project (3GPP), a mechanism of license assisted access (LAA) is proposed to use the unlicensed spectrum. That is to say, the use of unlicensed frequency bands is achieved with the assist of the licensed frequency bands. In order to ensure the coexistence with other system such as the Wi-Fi on the unlicensed frequency band, a mechanism for channel detection before data transmission is also introduced in LAA. When data is to be transmitted, the transmitter needs to detect whether the channel is idle, and sends the data only after the channel is in the idle state.

Figure 2:
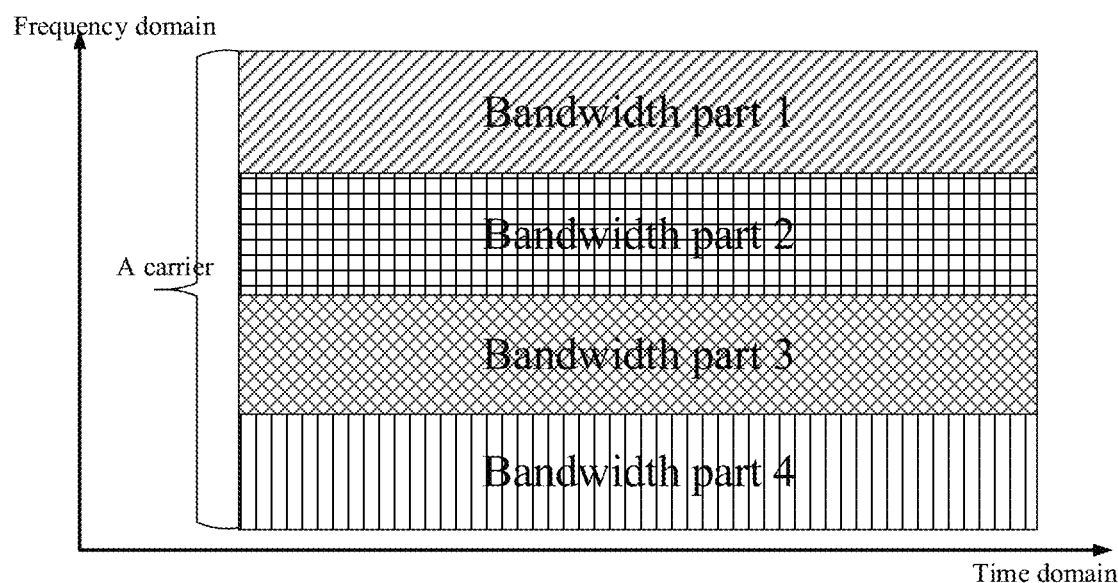
FIG. 2 is a schematic diagram illustrating that a carrier with a large bandwidth is divided into multiple bandwidth parts according to some examples of the present disclosure.

In the traditional cellular system operating on the unlicensed spectrum, the maximum bandwidth of a carrier is 20 MHz, while in the new generation communication system, the bandwidth occupied by a carrier may be larger, for example 100 MHz. In this case, the power consumption of the terminal can be saved by dividing a carrier with a relatively large bandwidth into multiple bandwidth parts. When the terminal is configured with multiple frequency resources such as multiple bandwidth parts, the manner through which the terminal performs data transmission on the frequency resources needs to be clarified. The bandwidth part refers to a resource that is continuous in part of the frequency domain within a carrier. As shown in FIG. 2, the bandwidth of a carrier is 80 MHz, which includes 4 bandwidth parts, and the bandwidth of each bandwidth part is 20 MHz.

Figure 3:
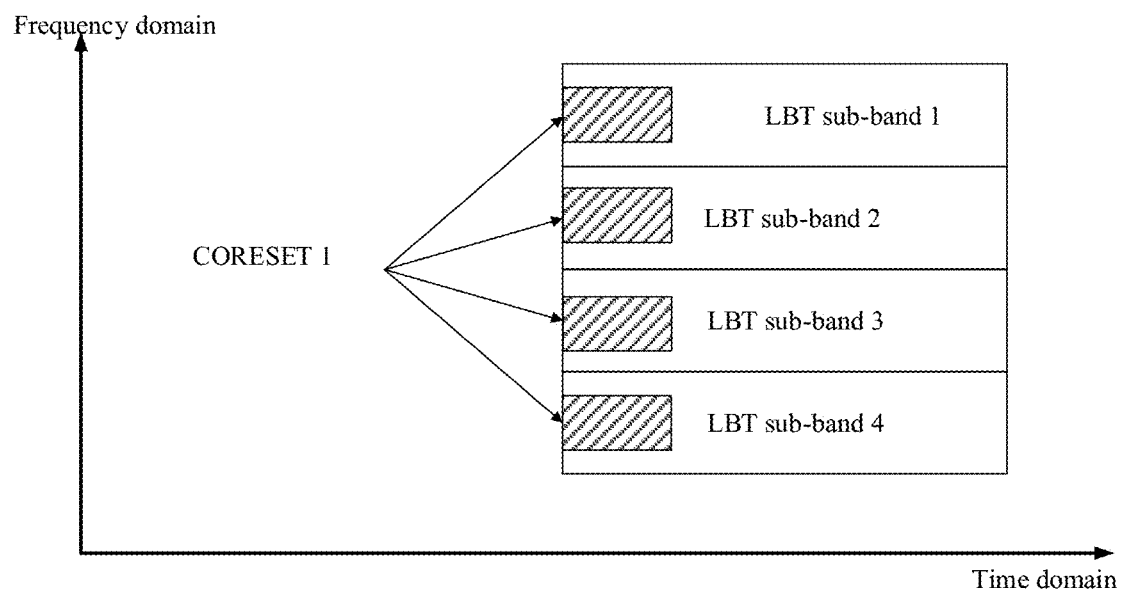
FIG. 3 is a schematic diagram of a configuration method of a control resource set according to some examples of the present disclosure.
Figure 4:
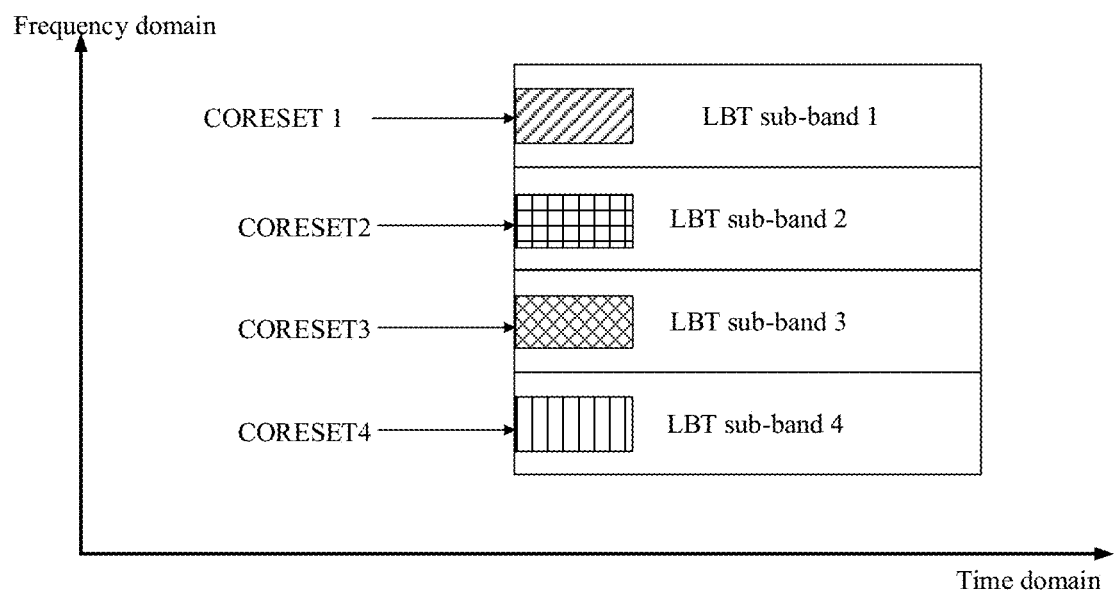
FIG. 4 is a schematic diagram of another configuration method of a control resource set according to some examples of the present disclosure.

As for the application of the new generation communication system on the unlicensed spectrum, since the communication system operating on the unlicensed spectrum needs to first detect whether the channel is idle, multiple channel detection units might be contained for a carrier or a bandwidth part, and channel detection results on different channel detection units may be inconsistent with each other. As a result, part of the control information will not be sent because the channel is unavailable. In the new generation communication system, the transmission of control signaling is carried on a control resource set (CORESET). The configuration of CORESET can be continuous or discontinuous in the frequency domain. A bandwidth part or a carrier including 4 LBT (Listen Before Talk) sub-bands is taken as an example. As shown in FIG. 3, the configuration of the CORESET is on the entire carrier or bandwidth part. In such CORESET configuration method, when the CORESET is configured on more than one LBT detection unit, the detection complexity of the user equipment will be relative low, but the reception performance of the control information for part of the user equipment is relatively deteriorated. As shown in FIG. 4, each LBT sub-band is configured with a different CORESET. With such CORESET configuration method, when each CORESET is configured within a LBT detection unit, the detection complexity of the terminal will be relatively high, but the reception performance of the control information for the user equipment can be guaranteed.

Based on the above wireless communication system, in order to ensure the reception performance of the control information for the user equipment and reduce the detection complexity of the terminal for the control resource set, various embodiments of the method of the present disclosure are proposed.

Figure 5:
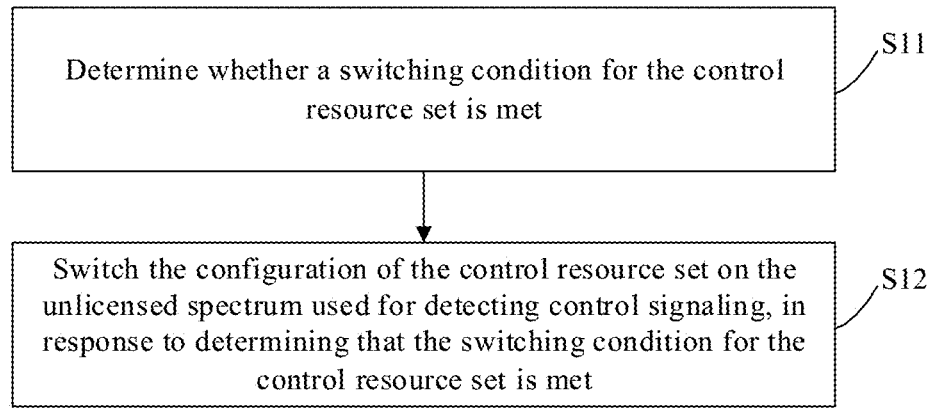
FIG. 5 is a flowchart I of a method for processing a control resource set according to some examples of the present disclosure.

FIG. 5 is a flowchart illustrating a method for processing a control resource set according to some embodiments. As shown in FIG. 5, the method for processing the control resource set is used in the user equipment (UE) and includes steps described below.

In step S11, it is determined whether a switching condition for the control resource set is met.

As an implementation manner, whether the switching condition for the control resource set is met is determined as follows:

determining that the switching condition for the control resource set is met in response to detecting that a channel in the unlicensed spectrum is successfully occupied by the base station.

In some embodiments, the determining that the switching condition for the control resource set is met in response to detecting that a channel in the unlicensed spectrum is successfully occupied by the base station, includes:

in response to detecting that a channel in the unlicensed spectrum is successfully occupied by the base station, switching configuration of the control resource set at a starting boundary position of the first slot where the unlicensed spectrum is successfully occupied by the base station.

In this way, in the case where the user equipment will not receive an explicit instruction sent from the base station regarding whether to switch and which control resource set to be switched to, the user equipment can use the configuration of different control resource sets based on whether the channel is successfully occupied by the base station. Compared with detecting the control signaling blindly, the complexity for the user equipment to detect the control signaling is reduced, the configuration of the control resource set adopted can be changed based on the channel occupancy, and the transmission of the control signaling can be ensured.

In some embodiments, the determining that the switching condition for the control resource set is met in response to detecting that a channel in the unlicensed spectrum is successfully occupied by the base station, includes:

in response to detecting that the channel in the unlicensed spectrum is successfully occupied by the base station, starting timing, and determining that the switching condition for the control resource set is met when a preset time interval is reached.

It should be noted that the preset time interval can be set or adjusted according to design requirements.

In this way, in the case that the user equipment will not receive an explicit instruction sent from the base station regarding the control resource set that is switched to, the user equipment can timely switch the configuration of the control resource set based on the channel occupancy to ensure the transmission of the control signaling.

As another implementation manner, whether the switching condition for the control resource set is met is determined by:

determining that the switching condition for the control resource set is met in response to a receipt of switching indication information.

In this way, it is convenient to switch the configuration of the control resource set according to the explicit indication of the base station, and to detect the control signaling on the control resource set indicated by the base station, which reduces the complexity of determining the control resource set by the user equipment.

In some embodiments, the receipt of the switching indication information includes:

receiving a physical layer signaling, and determining, from a preset information field of the physical layer signaling, configuration information of the control resource set to be switched.

The preset information field is an information field with a fixed bit length, or an information field with a configurable bit length.

In this way, it is convenient for the user equipment to determine the configuration information of the control resource set to be switched based on the physical layer signaling in response to the receipt of the physical layer signaling, which reduces the complexity for the user equipment to determine the control resource set.

For example, the physical layer signaling is a downlink control information (DCI) command, and a preset information field of the DCI carries the configuration information of the control resource set to be switched. The user equipment parses the preset information field to obtain the configuration information of the control resource set to be switched when receiving the DCI command.

In some embodiments, the receipt of the switching indication information includes:

receiving a signal carrying an orthogonal sequence set, and each orthogonal sequence in the orthogonal sequence set represents a control resource set; and determining the configuration information of the control resource set to be switched based on the signal.

Before receiving the signal carrying the orthogonal sequence set, the method further includes:

receiving a one-to-one correspondence between the orthogonal sequence and the control resource set sent from the base station.

In this way, it is convenient for the user equipment to determine the configuration information of the control resource set to be switched based on the correspondence when receiving the signal carrying the orthogonal sequence set, which reduces the complexity for the user equipment to determine the control resource set.

In step S12, when the switching condition for the control resource set is met, the configuration of the control resource set on the unlicensed spectrum used for detecting control signaling is switched.

In the technical solutions according to the embodiments of the present disclosure, when the switching condition for the control resource set is met, the UE switches the configuration of the control resource set on the unlicensed spectrum used for detecting control signaling. Through using different control resource set configurations in different states, it is ensured to detect the control signaling on the available control resource set. Compared with blindly detecting the control signaling and using the control resource set, not only the complexity for the user equipment to detect the control resource set is reduced, but also the control information reception of the user equipment is ensured, thus improving the reception performance of the control information.

When the base station has not yet occupied the unlicensed spectrum resources, if it is pre-configured that the user equipment needs to perform the control signaling detection, the user equipment detects the control signaling based on the pre-configured or pre-defined control resource set configuration. For example, the user equipment detects the control signaling based on a manner in which a control resource set is mapped on the entire bandwidth part. After the base station successfully occupies the channel, the user equipment switches the configuration of the control resource set.

Figure 6:
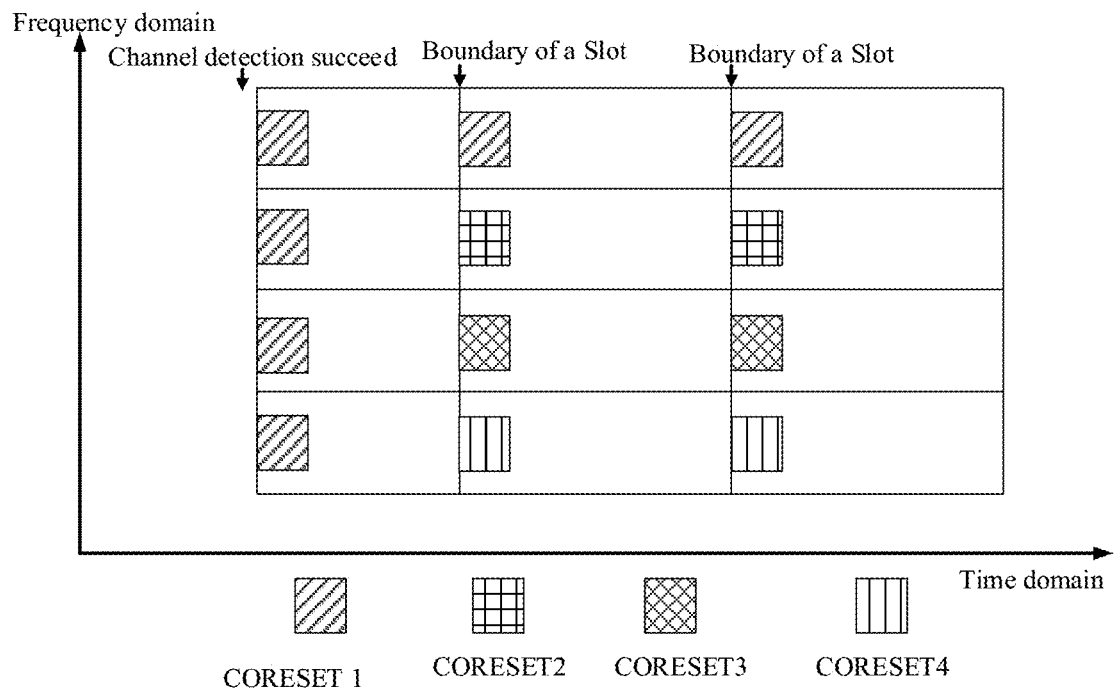
FIG. 6 is a schematic diagram of determining to switch a configuration of a control resource set according to some examples of the present disclosure.

FIG. 6 is a schematic diagram of determining to switch a configuration of the control resource set according to some embodiments. As shown in FIG. 6, when the base station has not yet occupied any channel, the user equipment always uses the configuration of CORESET1 to detect the control signaling. When finding that the base station has successfully occupied a channel, the user equipment switches the configuration of the CORESET at a boundary of a slot, and detects the control signaling based on CORESET1, 2, 3 and 4. The technical solution of the embodiments provides a method for switching, by the user equipment, the CORESET configuration on the unlicensed spectrum, especially in the case of supporting broadband operation, which can effectively enable the user equipment to detect the transmission of the control signaling with lower detection complexity.

Figure 7:
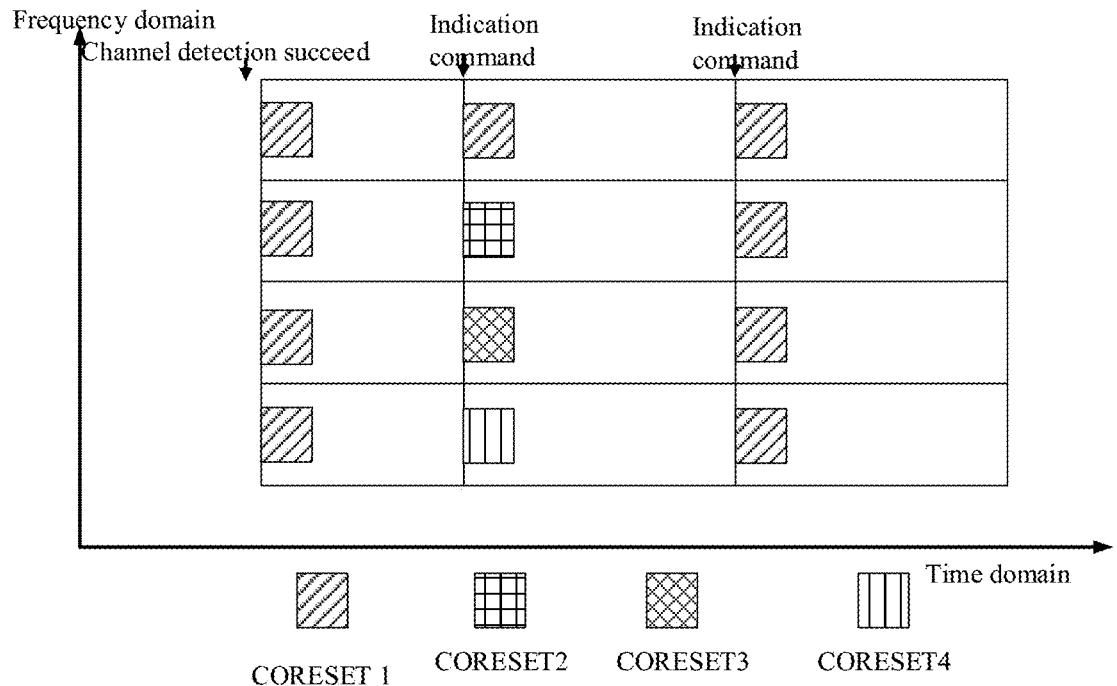
FIG. 7 is a schematic diagram of determining to switch a configuration of a control resource set according to some examples of the present disclosure.

FIG. 7 is a schematic diagram of determining to switch a configuration of a control resource set according to some embodiments. As shown in FIG. 7, when the base station has not yet occupied any channel, the user equipment always uses the configuration of CORESET1 to detect the control signaling. When finding that the base station has successfully occupied a channel and receiving an indication command for triggering the user equipment to switch the CORESET configuration, according to the indication command, the user equipment detects the control signaling based on CORESET 1, 2, 3 and 4. When receiving an indication command, sent by the base station, for triggering the user equipment to switch the CORESET configuration again, the user equipment detects the control signaling based on CORESET1. The technical solution of the embodiments provides a method for switching, by the user equipment, the CORESET configuration on the unlicensed spectrum, especially in the case of supporting broadband operation, which can effectively enable the user equipment to detect the transmission of the control signaling with lower detection complexity.

Figure 8:
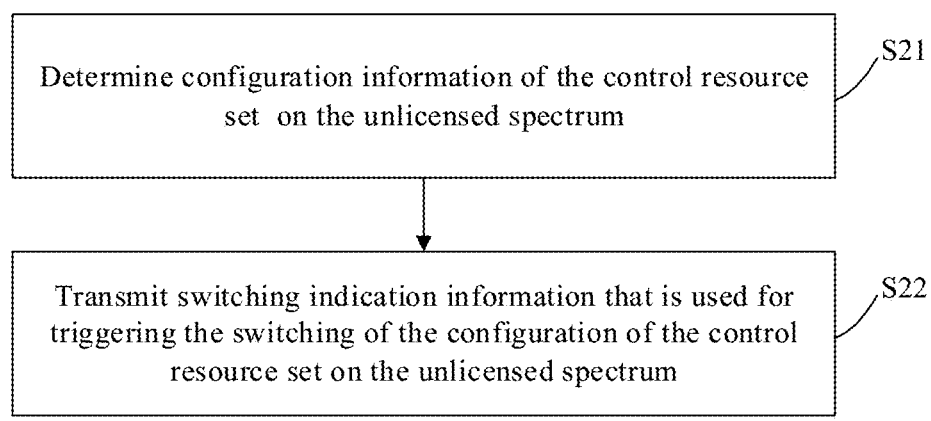
FIG. 8 is a schematic diagram II of a method for processing a control resource set according to some examples of the present disclosure.

FIG. 8 is a schematic diagram II of a method for processing a control resource set according to some embodiments. As shown in FIG. 8, the processing method for the control resource set is used in a base station, and includes steps described below.

In step S21, the configuration of the control resource set for detecting the control signaling on the unlicensed spectrum is determined.

In step S22, switching indication information that is used for triggering the switching of the configuration of the control resource set for detecting the control signaling on the unlicensed spectrum, is transmitted.

In this way, the switching indication information is transmitted to the UE so that the UE may switch the configuration of the control resource set based on the switching indication information, thereby ensuring that the control signaling is detected on the available control resource set. Compared with the manner that the UE blindly detects the control signaling and uses the control resource set, the present application not only reduces the complexity for the user equipment to detect the control resource set, but also ensures the reception of the control information and thus improving the reception performance of the control information.

As an implementation manner, the switching indication information, that is used for triggering the switching of the configuration of the control resource set for detecting the control signaling on the unlicensed spectrum, is transmitted by:
  carrying, on the preset information field of the physical layer signaling, the configuration information of the control resource set for detecting the control signaling on the unlicensed spectrum; and
  transmitting the physical layer signaling.

The preset information field is an information field with a fixed bit length, or an information field with a configurable bit length.

For example, the physical layer signaling is a downlink control information (DCI) command, and a preset information field of the DCI carries the configuration information of the control resource set to be switched. The user equipment parses the preset information field to obtain the configuration information of the control resource set to be switched when receiving the DCI command.

As an embodiment, the method further includes:
  transmitting a one-to-one correspondence between orthogonal sequences and control resource sets.

In this way, it is convenient for the user equipment to determine the configuration information of the control resource set to be switched based on the correspondence when receiving the signal carrying the orthogonal sequence set, which reduces the complexity for the user equipment to determine the control resource set.

As an implementation manner, the switching indication information, that is used for triggering the switching of the configuration of the control resource set for detecting the control signaling on the unlicensed spectrum, is transmitted by:
  configuring an orthogonal sequence set, where each orthogonal sequence in the orthogonal sequence set represents a control resource set; and
  transmitting a signal carrying the orthogonal sequence set.

In this way, it is convenient for the user equipment to determine the configuration information of the control resource set to be switched based on the signal carrying the orthogonal sequence set when receiving the signal carrying the orthogonal sequence set, which reduces the complexity for the user equipment to determine the control resource set.

According to the solutions of the embodiments of the present disclosure, the switching indication information is transmitted to the UE so that the UE may switch the configuration of the control resource set based on the switching indication information, thereby ensuring that the control signaling is detected on the available control resource set. Compared with the manner that the UE blindly detects the control signaling and uses the control resource set, the present application not only reduces the complexity for the user equipment to detect the control resource set, but also ensures the reception of the control information and thus improving the reception performance of the control information.

Figure 9:
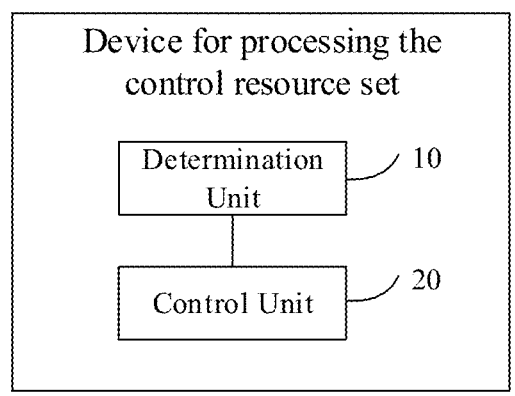
FIG. 9 is a block diagram I of a processing device for a control resource set according to some examples of the present disclosure.

FIG. 9 is a block diagram I of a processing device for a control resource set according to some embodiments. The processing device for the control resource set is applied to the UE side. Referring to FIG. 9, the device includes a determination unit 10 and a control unit 20.

The determination unit 10 is configured to determine whether a switching condition for the control resource set is met.

The control unit 20 is configured to switch the configuration of the control resource set for detecting a control signaling on the unlicensed spectrum in response to determining that the switching condition for the control resource set is met.

As an implementation manner, the determination unit 10 is further configured to:
  determine that the switching condition for the control resource set is met in response to detecting that a channel in the unlicensed spectrum is successfully occupied by the base station.

In some specific embodiments, the determination unit 10 is configured to:
  in response to detecting that a channel in the unlicensed spectrum is successfully occupied by the base station, switch the configuration of the control resource set at a starting boundary position of a first slot where the unlicensed spectrum is successfully occupied by the base station.

In some specific embodiments, the determination unit 10 is configured to:
  in response to detecting that the channel in the unlicensed spectrum is successfully occupied by the base station, start timing, and determine that the switching condition for the control resource set is met when a preset time interval is reached.

As an implementation manner, the determination unit 10 is further configured to:
  determine that the switching condition for the control resource set is met in response to a receipt of switching indication information.

In some specific embodiments, the determination unit 10 is configured to:
  receive a physical layer signaling, and determine the configuration information of the control resource set to be switched from a preset information field of the physical layer signaling.

The preset information field is an information field with a fixed bit length, or an information field with a configurable bit length.

As an implementation manner, the determination unit 10 is further configured to:
  receive a one-to-one correspondence between orthogonal sequences and control resource sets.

In some specific embodiments, the determination unit 10 is configured to:
  receive a signal carrying an orthogonal sequence set, where each orthogonal sequence in the orthogonal sequence set represents a control resource set; and
  determine, based on the signal, the configuration information of the control resource set to be switched.

As for the device provided in the above embodiments, the specific manner in which each module performs the operation has been described in detail in the method embodiment, and detailed description will not be given here.

In practical applications, the specific structures of the determination unit 10 and the control unit 20 can be implemented by the processing device for the control resource set or a central processing unit (CPU), a micro controller unit (MCU), a digital signal processor (DSP) or a programmable logic controller (PLC) etc. in the user equipment to which the processing device for the control resource set belongs.

The processing device for the control resource set described in the embodiments may be provided on the user equipment side.

Those skilled in the art should understand that the functions of each processing module in the processing device for the control resource set according to the embodiments of the present disclosure can be understood by referring to the foregoing description of the processing method for the control resource set applied to the user equipment side. Each processing module in the processing device for the control resource set can be realized by an analog circuit that implements the functions described in the embodiments of the present disclosure, or can be realized by running software that executes the functions described in the embodiments of the present disclosure on a terminal.

In the processing device for the control resource set according to the embodiments of the present disclosure, when the switching condition for the control resource set is met, the configuration of the control resource set for detecting the control signaling on the unlicensed spectrum, is switched. Through using different control resource set configurations in different states, it is ensured to detect the control signaling on the available control resource set. Compared with blindly detecting the control signaling and using the control resource set, not only the complexity for the user equipment to detect the control resource set is reduced, but also the control information reception of the user equipment is ensured, thus improving the reception performance of the control information.

Figure 10:
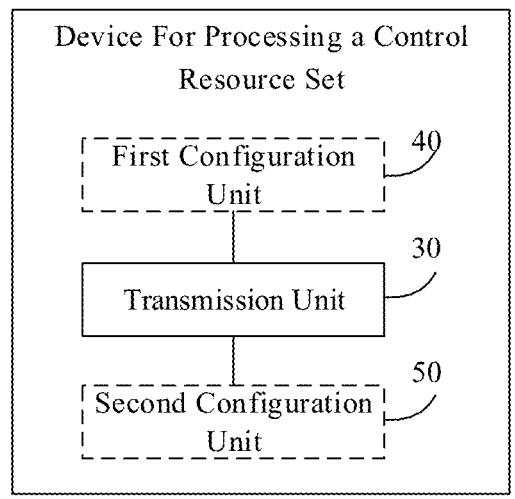
FIG. 10 is a block diagram II of a processing device for a control resource set according to some examples of the present disclosure.

FIG. 10 is a block diagram II of a processing device for a control resource set according to some embodiments. The processing device for the control resource set is applied to the base station side. Referring to FIG. 10, the device includes a transmission unit 30.

The transmission unit 30 is configured to transmit switching indication information that is used for triggering a switching of configuration of a control resource set for detecting a control signaling on the unlicensed spectrum.

In the above solution, the device also includes:
a first configuration unit 40, configured to determine configuration information of a control resource set to be switched and used for detecting the control signaling on the unlicensed spectrum.

The transmission unit 30 is configured to carry, on a preset information field of a physical layer signaling, the configuration information of the control resource set on the unlicensed spectrum, and transmit the physical layer signaling.

The preset information field is an information field with a fixed bit length, or an information field with a configurable bit length.

In the above solution, the device also includes:
a second configuration unit 50, configured to configure an orthogonal sequence set, where each orthogonal sequence in the orthogonal sequence set represents a control resource set.

The transmission unit 30 is configured to transmit a signal carrying the orthogonal sequence set.

In some embodiments, the second configuration unit 50 is further configured to configure a one-to-one correspondence between the orthogonal sequence and the control resource set, and the transmission unit 30 is further configured to transmit the correspondence.

As for the device provided in the above embodiments, the specific manner in which each module performs the operation has been described in detail in the method embodiment, and detailed description will not be given here.

In practical applications, the specific structures of the transmission unit 30, the first configuration unit 40 and the second configuration unit 50 can all be implemented by the processing device for the control resource set or the CPU, MCU, DSP or PLC and so on in the base station to which the processing device for the control resource set belongs.

The processing device for the control resource set described in the embodiments may be provided on the base station side.

Those skilled in the art should understand that the functions of each processing module in the processing device for the control resource set according to the embodiments of the present disclosure can be understood by referring to the foregoing description of the processing method for the control resource set applied to the base station side. Each processing module in the processing device for the control resource set can be realized by an analog circuit that implements the functions described in the embodiments of the present disclosure, or can be realized by running software that executes the functions described in the embodiments of the present disclosure on a terminal.

The processing device for a control resource set described in the embodiments of the present disclosure transmits the switching indication information to the UE, so that the UE may switch the configuration of the control resource set at an appropriate time, thereby ensuring that control signaling is detected on the available control resource set. Compared with the manner that the UE blindly detects the control signaling and uses the control resource set, the processing device for the control resource set not only reduces the complexity for the user equipment to detect the control resource set, but also ensures the reception of the control information, and thus improving the reception performance of the control information.

Figure 11:
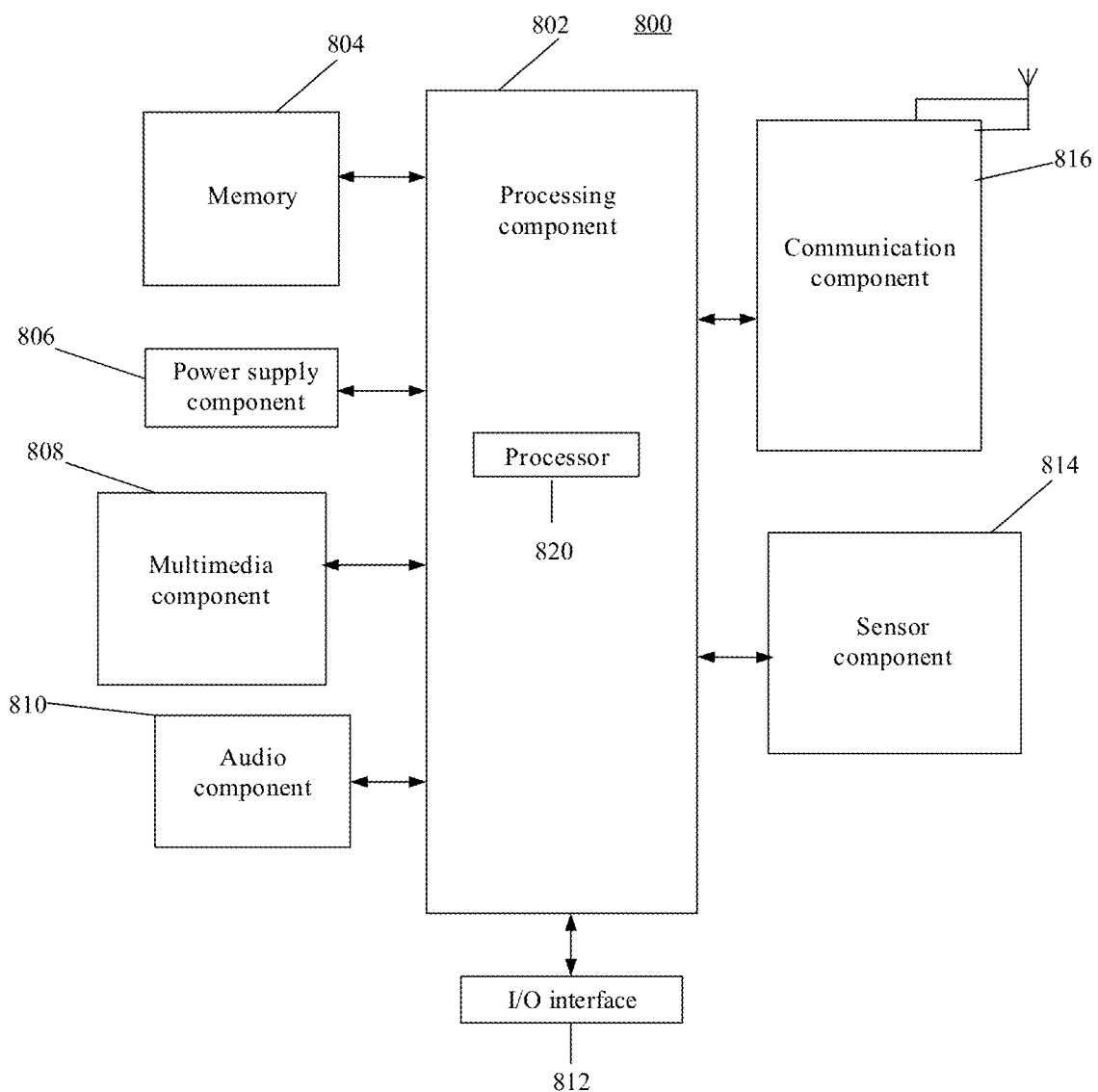
FIG. 11 is a block diagram I of a device for processing a control resource set according to some examples of the present disclosure.

FIG. 11 is a block diagram of a device 800 for processing a control resource set according to some embodiments. For example, the device 800 may be a mobile phone, a computer, a digital broadcast terminal, a messaging device, a game console, a tablet device, a medical device, a fitness device, a personal digital assistant and the like.

Referring to FIG. 11, the device 800 may include one or more of the following components: a processing component 802, a memory 804, a power supply component 806, a multimedia component 808, an audio component 810, an input/output (I/O) interface 812, a sensor component 814, and a communication component 816.

Generally, the processing component 802 is configured to control the overall operations of the device 800, such as operations associated with displaying, telephone calling, data communications, camera operations, and recording operations. The processing component 802 may include one or more processors 820 to execute instructions to complete all or part of the steps in the foregoing method. In addition, the processing component 802 may include one or more modules to facilitate the interaction between the processing component 802 and other components. For example, the processing component 802 may include a multimedia module to facilitate the interaction between the multimedia component 808 and the processing component 802.

The memory 804 is configured to store various data to support operations of the device 800. Examples of the data include instructions of any application or method that can be run on the device 800, contact data, phonebook data, messages, pictures and videos and the like. The memory 804 can be implemented by any type of volatile or non-volatile storage device or their combination, such as static random access memory (SRAM), electrically erasable programmable read-only memory (EEPROM), erasable and Programmable read-only memory (EPROM), programmable read-only memory (PROM), read-only memory (ROM), magnetic memory, flash memory, magnetic disk or optical disk.

The power supply component 806 is configured to supply power to various components of the device 800. The power supply component 806 may include a power management system, one or more power supplies, and other components associated with generating, managing, and distributing power for the device 800.

The multimedia component 808 includes a screen that provides an output interface between the device 800 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, sliding, and gestures on the touch panel. The touch sensor may not only sense the boundary of the touch or sliding operation, but also detect the duration and pressure related to the touch or sliding operation. In some embodiments, the multimedia component 808 includes a front camera and/or a rear camera. When the device 800 is in an operation mode, such as a shooting mode or a video mode, the front camera and/or the rear camera can receive external multimedia data. Each front camera and rear camera can be a fixed optical lens system or have focal length and optical zoom capabilities.

The audio component 810 is configured to output and/or input audio signals. For example, the audio component 810 includes a microphone (MIC), and when the device 800 is in an operation mode, such as a call mode, a recording mode, and a voice recognition mode, the microphone is configured to receive external audio signals. The received audio signal may be further stored in the memory 804 or transmitted via the communication component 816. In some embodiments, the audio component 810 further includes a speaker for outputting audio signals.

The I/O interface 812 provides an interface between the processing component 802 and a peripheral interface module. The peripheral interface module may be a keyboard, a click wheel, a button, and the like. The button includes but not limits to a home button, a volume button, a start button and a lock button.

The sensor component 814 includes one or more sensors for providing the device 800 with state evaluation in various aspects. For example, the sensor component 814 can detect the on/off state of the device 800 and the relative positioning of the components. For example, the component is the display and the keypad of the device 800. The sensor component 814 can also detect the position change of the device 800 or of a component of the device 800, the presence or absence of contact between the user and the device 800, the orientation or acceleration/deceleration of the device 800, and the temperature change of the device 800. The sensor component 814 may include a proximity sensor configured to detect the presence of nearby objects when there is no physical contact. The sensor component 814 may also include an optical sensor, such as a Complementary Metal Oxide Semiconductor (CMOS) image sensor or a Charge-coupled Device (CCD) image sensor used in imaging applications. In some embodiments, the sensor component 814 may also include an acceleration sensor, a gyroscope sensor, a magnetic sensor, a pressure sensor or a temperature sensor.

The communication component 816 is configured to facilitate wired or wireless communication between the device 800 and other devices. The device 800 can access a wireless network based on a communication standard, such as Wi-Fi, 2G, or 3G, or a combination thereof. In some embodiments, the communication component 816 receives a broadcast signal or broadcast related information from an external broadcast management system via a broadcast channel. In some embodiments, the communication component 816 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In some embodiments, the device 800 may be implemented by one or more application-specific integrated circuits (ASIC), digital signal processors (DSP), digital signal processing devices (DSPD), Programmable Logic Device (PLD), Field Programmable Gate Array (FPGA), controller, microcontroller, microprocessor, or other electronic component, so as to perform the method applied at the user terminal side for processing the control resource set.

In some embodiments, there is further provided a non-transitory computer storage medium including executable instructions, such as a memory 804 including executable instructions, which may be executed by the processor 820 of the device 800 to complete the foregoing method. For example, the non-transitory computer storage medium may be a ROM, a random access memory (RAM), a CD-ROM, a magnetic tape, a floppy disk, an optical data storage device, etc.

Figure 12:
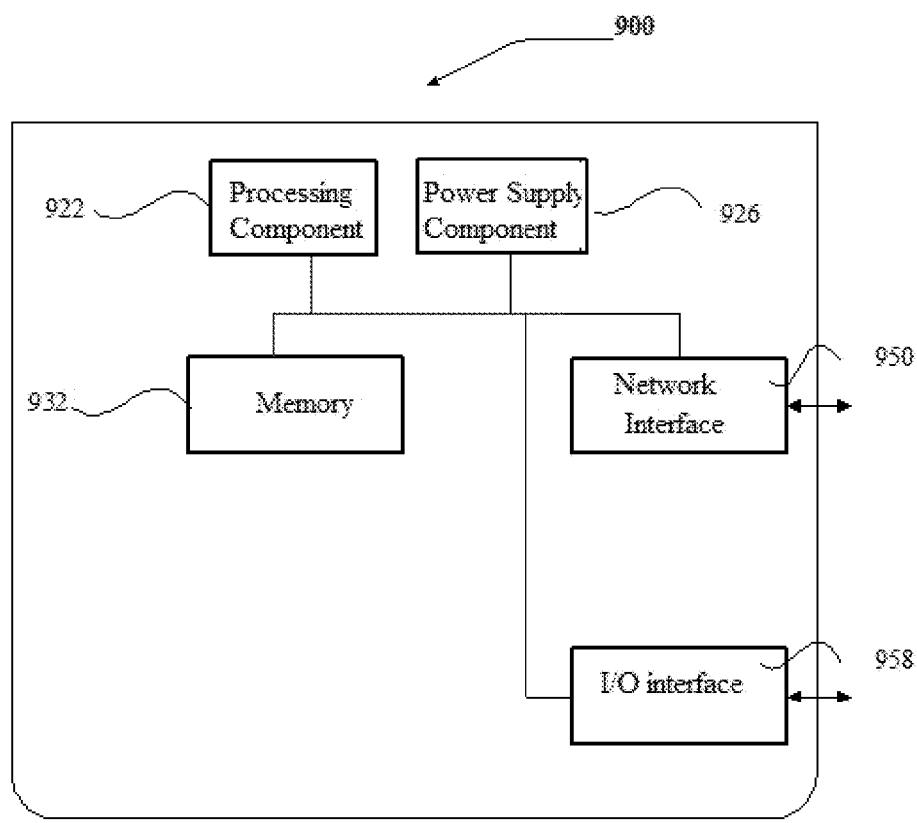
FIG. 12 is a block diagram II of a device for processing a control resource set according to some examples of the present disclosure.

FIG. 12 is a block diagram of a device 900 for processing a control resource set according to some embodiments. For example, the device 900 may be provided as a server. Referring to FIG. 12, the device 900 includes: a processing component 922, which further includes one or more processors; and a memory resource, represented by a memory 932, and used for storing instructions executable by the processing component 922, such as an application program. The application program stored in the memory 932 may include one or more modules, and each module corresponds to a set of instructions. In addition, the processing component 922 is configured to execute the instructions to execute the above-mentioned method applied at the base station side for processing the control resource set.

The device 900 may further include: a power supply component 926 configured to perform power management of the device 900, a wired or wireless network interface 950 configured to connect the device 900 to a network, and an input/output (I/O) interface 958. The device 900 may operate based on an operating system stored in the memory 932, such as Windows Server™, Mac OS X™, Unix™, Linux™, FreeBSD™ or the like.

The technical solutions described in the embodiments of the present disclosure may be combined arbitrarily if there is no conflict.

A first aspect of the present disclosure provides a method for processing a control resource set. The method includes:

switching a configuration of a control resource set on an unlicensed spectrum used for detecting a control signaling in response to determining that a switching condition for the control resource set is met.

In the above solution, determining that the switching condition for the control resource set is met includes:

determining that the switching condition for the control resource set is met in response to detecting that a channel in the unlicensed spectrum is successfully occupied by a base station.

In the above solution, determining that the switching condition for the control resource set is met in response to detecting that a channel in the unlicensed spectrum is successfully occupied by a base station, includes:

in response to detecting that a channel in the unlicensed spectrum is successfully occupied by the base station, switching the configuration of the control resource set at a starting boundary position of a first slot where the unlicensed spectrum is successfully occupied by the base station.

In the above solution, determining that the switching condition for the control resource set is met in response to detecting that a channel in the unlicensed spectrum is successfully occupied by a base station, includes:

in response to detecting that the channel in the unlicensed spectrum is successfully occupied by the base station, starting timing, and determining that the switching condition for the control resource set is met when a preset time interval is reached.

In the above solution, determining that the switching condition for the control resource set is met includes:

determining that the switching condition for the control resource set is met in response to a receipt of switching indication information.

In the above solution, the receipt of switching indication information includes:

receiving a physical layer signaling, and determining configuration information of a control resource set to be switched from a preset information field of the physical layer signaling.

In the above solution, the preset information field is an information field with a fixed bit length, or an information field with a configurable bit length.

In the above solution, the receipt of switching indication information includes:

receiving a signal carrying an orthogonal sequence set, where each orthogonal sequence in the orthogonal sequence set represents a control resource set; and determining, based on the signal, the configuration information of the control resource set to be switched.

In the above solution, before receiving the signal carrying the orthogonal sequence set, the method further includes:

receiving a one-to-one correspondence between orthogonal sequences and control resource sets.

A second aspect of the present disclosure provides a method for processing a control resource set. The method includes:

transmitting switching indication information that is used for triggering a switching of a configuration of a control resource set for detecting a control signaling on the unlicensed spectrum.

In the above solution, the transmitting switching indication information that is used for triggering a switching of a configuration of a control resource set for detecting a control signaling on the unlicensed spectrum, includes:

carrying, on a preset information field of a physical layer signaling, configuration information of the control resource set for detecting the control signaling on the unlicensed spectrum; and transmitting the physical layer signaling.

In the above solution, the preset information field is an information field with a fixed bit length, or an information field with a configurable bit length.

In the above solution, the transmitting switching indication information that is used for triggering a switching of a configuration of a control resource set for detecting a control signaling on the unlicensed spectrum, includes:

configuring an orthogonal sequence set, wherein each orthogonal sequence in the orthogonal sequence set represents a control resource set; and transmitting a signal carrying the orthogonal sequence set.

In the above solution, the method further includes:

transmitting a one-to-one correspondence between orthogonal sequences and control resource sets.

A third aspect of the present disclosure provides a device for processing a control resource set. The device includes:

a determination unit, configured to determine whether a switching condition for a control resource set is met; and a control unit, configured to switch a configuration of the control resource set for detecting a control signaling on the unlicensed spectrum, in response to determining that the switching condition for the control resource set is met.

In the above solution, the determination unit is further configured to:

determine that the switching condition for the control resource set is met in response to detecting that a channel in the unlicensed spectrum is successfully occupied by a base station.

In the above solution, the determination unit is configured to:

in response to detecting that a channel in the unlicensed spectrum is successfully occupied by the base station, switch the configuration of the control resource set at a starting boundary position of a first slot where the unlicensed spectrum is successfully occupied by the base station.

In the above solution, the determination unit is configured to:

in response to detecting that the channel in the unlicensed spectrum is successfully occupied by the base station, start timing, and determine that the switching condition for the control resource set is met when a preset time interval is reached.

In the above solution, the determination unit is further configured to:

determine that the switching condition for the control resource set is met in response to a receipt of switching indication information.

In the above solution, the determination unit is configured to:

receive a physical layer signaling, and determine configuration information of a control resource set to be switched from a preset information field of the physical layer signaling.

In the above solution, the preset information field is an information field with a fixed bit length, or an information field with a configurable bit length.

In the above solution, the determination unit is configured to:
receive a signal carrying an orthogonal sequence set, where each orthogonal sequence in the orthogonal sequence set represents a control resource set; and
determine, based on the signal, the configuration information of the control resource set to be switched.

In the above solution, the determination unit is further configured to:
receive a one-to-one correspondence between orthogonal sequences and control resource sets.

A fourth aspect of the present disclosure provides a device for processing a control resource set. The device includes:
a transmission unit, configured to transmit switching indication information that is configured to trigger a switching of a configuration of a control resource set on an unlicensed spectrum for detecting a control signaling.

In the above solution, the device further includes:
a first configuration unit, configured to determine configuration information of the control resource set for detecting the control signaling on the unlicensed spectrum;
where the transmission unit is configured to carry, on a preset information field of a physical layer signaling, the configuration information of the control resource set for detecting the control signaling on the unlicensed spectrum, and transmit the physical layer signaling.

In the above solution, the preset information field is an information field with a fixed bit length, or an information field with a configurable bit length.

In the above solution, the device further includes:
a second configuration unit, configured to configure an orthogonal sequence set, wherein each orthogonal sequence in the orthogonal sequence set represents a control resource set;
where the transmission unit is configured to transmit a signal carrying the orthogonal sequence set.

In the above solution, the second configuration unit is further configured to configure a one-to-one correspondence between orthogonal sequences and control resource sets; and
the transmission unit is further configured to transmit the correspondence.

A fifth aspect of the present disclosure provides a device for processing a control resource set. The device includes:
a processor; and
a memory for storing instructions executable by the processor;
the processor is configured to execute the executable instructions to implement any method described above that is applied to the base station side and used for processing the control resource set.

A sixth aspect of the present disclosure provides a device for processing a control resource set. The device includes:
a processor; and
a memory for storing instructions executable by the processor;
the processor is configured to execute the executable instructions to implement any method described above that is applied to the user equipment (UE) side and used for processing the control resource set.

A seventh aspect of the embodiments of the present disclosure provides a computer storage medium with executable instructions stored thereon. The executable instructions, when executed by the processor, cause the processor to execute the method described above that is applied to the base station side and used for processing the control resource set.

An eighth aspect of the embodiments of the present disclosure provides a computer storage medium with executable instructions stored thereon. The executable instructions, when executed by the processor, cause the processor to execute the method described above that is applied to the UE side and used for processing the control resource set.

Other embodiments of the present disclosure will be apparent to those skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is merely defined by the appended claims.

What is claimed is:

1. A method for processing a control resource set, comprising:
switching, by a terminal, a configuration of a control resource set for detecting a control signaling on an unlicensed spectrum in response to determining that a switching condition for the control resource set is met, wherein the switching condition for the control resource set comprises detecting that a channel in the unlicensed spectrum is successfully occupied by a base station.

2. The method according to claim 1, wherein switching the configuration of the control resource set for detecting the control signaling on the unlicensed spectrum in response to determining that the switching condition for the control resource set is met, comprises:
in response to detecting that the channel in the unlicensed spectrum is successfully occupied by the base station, starting timing, and determining that the switching condition for the control resource set is met when a preset time interval is reached.

3. The method according to claim 1, wherein switching the configuration of the control resource set for detecting the control signaling on the unlicensed spectrum in response to determining that the switching condition for the control resource set is met, comprises:
in response to detecting that a channel in the unlicensed spectrum is successfully occupied by the base station, switching the configuration of the control resource set at a starting boundary position of a first slot where the unlicensed spectrum is successfully occupied by the base station.

4. A device for processing a control resource set, comprising:
a processor; and
a memory for storing instructions executable by the processor;
wherein the processor is configured to execute the executable instructions to implement the method for processing the control resource set according to claim 1.

5. A method for processing a control resource set, comprising:
- switching, by a terminal, a configuration of a control resource set for detecting a control signaling on an unlicensed spectrum in response to determining that a switching condition for the control resource set is met, wherein the switching condition for the control resource set comprises:
- receiving switching indication information, and wherein the switching indication information comprises a signal carrying an orthogonal sequence set, and each orthogonal sequence in the orthogonal sequence set represents a control resource set.

6. The method according to claim 5, wherein the switching indication information further comprises a physical layer signaling, and wherein receiving the switching indication information comprises:
- receiving the physical layer signaling, and determining configuration information of a control resource set to be switched from a preset information field of the physical layer signaling.

7. The method according to claim 6, wherein the preset information field is an information field with a fixed bit length, or an information field with a configurable bit length.

8. The method according to claim 5, wherein receiving the switching indication information comprises:
- receiving the signal carrying the orthogonal sequence set; and
- determining, based on the signal, the configuration information of the control resource set to be switched.

9. The method according to claim 8, wherein before receiving the signal carrying the orthogonal sequence set, the method further comprises:
- receiving a one-to-one correspondence between orthogonal sequences and control resource sets.

10. A device for processing a control resource set, comprising:
- a processor; and
- a memory for storing instructions executable by the processor;
- wherein the processor is configured to execute the executable instructions to implement the method for processing the control resource set according to claim 5.

11. A method for processing a control resource set, comprising:
- transmitting, by a base station, switching indication information for triggering a switching of a configuration of a control resource set for detecting a control signaling on an unlicensed spectrum, wherein the switching indication information comprises a signal carrying an orthogonal sequence set, and each orthogonal sequence in the orthogonal sequence set represents a control resource set.

12. A device for processing a control resource set, comprising:
- a processor; and
- a memory for storing instructions executable by the processor;
- wherein the processor is configured to execute the executable instructions to implement the method for processing the control resource set according to claim 10.

13. The method according to claim 11, wherein the transmitting switching indication information for triggering a switching of a configuration of a control resource set for detecting a control signaling on the unlicensed spectrum, comprises:
- configuring the orthogonal sequence set; and
- transmitting the signal carrying the orthogonal sequence set.

14. The method according to claim 13, further comprising:
- transmitting a one-to-one correspondence between orthogonal sequences and control resource sets.

15. The method according to claim 11, wherein the switching indication information further comprises a physical layer signaling, and wherein the transmitting switching indication information for triggering a switching of a configuration of a control resource set for detecting a control signaling on the unlicensed spectrum, comprises:
- carrying, on a preset information field of the physical layer signaling, configuration information of the control resource set for detecting the control signaling on the unlicensed spectrum; and
- transmitting the physical layer signaling.

16. The method according to claim 15, wherein the preset information field is an information field with a fixed bit length, or an information field with a configurable bit length.

* * * * *